United States Patent
Sindhushayana et al.

(10) Patent No.: US 8,656,246 B2
(45) Date of Patent: Feb. 18, 2014

(54) METHOD AND AN APPARATUS FOR USE OF CODES IN MULTICAST TRANSMISSION

(75) Inventors: Nagabhushana T. Sindhushayana, San Diego, CA (US); Jack K. Wolf, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2804 days.

(21) Appl. No.: 09/835,903

(22) Filed: Apr. 16, 2001

(65) Prior Publication Data
US 2003/0007487 A1    Jan. 9, 2003

(51) Int. Cl.
*H03M 13/00*    (2006.01)

(52) U.S. Cl.
USPC .......................................... 714/755; 714/756

(58) Field of Classification Search
USPC ................................... 714/755, 756
See application file for complete search history.

(56) References Cited

U.S. PATENT DOCUMENTS

| | | | | |
|---|---|---|---|---|
| 4,564,945 A | * | 1/1986 | Glover et al. ................. | 714/769 |
| 4,604,655 A | * | 8/1986 | Moriyama .................... | 386/241 |
| 4,627,058 A | * | 12/1986 | Moriyama .................... | 714/758 |
| 4,653,051 A | * | 3/1987 | Sugimura et al. ............ | 714/755 |
| 4,654,853 A | * | 3/1987 | Moriyama et al. ........... | 714/774 |
| 4,665,537 A | * | 5/1987 | Moriyama .................... | 714/755 |
| 4,670,881 A | * | 6/1987 | Imoto ........................... | 714/755 |
| 4,688,225 A | * | 8/1987 | Fukami et al. ............... | 714/755 |
| 4,696,007 A | * | 9/1987 | Moriyama .................... | 714/752 |
| 4,719,628 A | * | 1/1988 | Ozaki et al. .................. | 714/755 |
| 4,742,517 A | * | 5/1988 | Takagi et al. ................. | 714/702 |
| 4,760,576 A | * | 7/1988 | Sako ............................. | 714/755 |
| 4,764,927 A | * | 8/1988 | Izumita et al. ............... | 714/761 |
| 4,769,818 A | * | 9/1988 | Mortimer ..................... | 714/755 |
| 4,785,451 A | * | 11/1988 | Sako et al. .................... | 714/756 |
| 4,819,236 A | * | 4/1989 | Sako et al. .................... | 714/755 |
| 4,866,636 A | * | 9/1989 | Fukami et al. ............... | 708/203 |
| 4,901,307 A | | 2/1990 | Gilhousen et al. | |
| 4,907,215 A | * | 3/1990 | Sako et al. .................. | 369/59.25 |
| 5,003,541 A | * | 3/1991 | Mester ......................... | 714/767 |
| 5,103,459 A | | 4/1992 | Gilhousen et al. | |
| 5,107,505 A | * | 4/1992 | Lelandais et al. ............ | 714/755 |
| 5,192,949 A | * | 3/1993 | Suzuki et al. ................. | 341/68 |

(Continued)

OTHER PUBLICATIONS

T. Truong, et al., "Inversionless Decoding of Both Errors and Erasures of Reed-Solomon Code," IEEE Transactions on Communications, vol. 46. No. 8, Aug. 1998. (pp. 973-976).

(Continued)

*Primary Examiner* — Joseph D Torres
(74) *Attorney, Agent, or Firm* — Larry J. Moskowitz

(57) ABSTRACT

A method and apparatus for multicasting of a multi-packet message are disclosed. Data to be transmitted as a message are divided into N sets, each set being encoded to generate encoded data. A set of parity bits is separated from each of the N sets of encoded data. The N sets of separated parity bits are encoded by a systematic code with a predetermined distance S across the N sets, resulting in N' parity-bit packets. The N' parity-bit packets are encoded with a code that is selected so that each receiving station decodes the N' parity-bit packets with a high probability. The N-packet message, comprising the N sets of encoded data less the separated bits, and the N' packets are multicasted. If less than S packets of the N-packet message fail to decode at a receiving station, the receiving station recovers all N packets using the N' packets.

8 Claims, 6 Drawing Sheets

(56) References Cited

U.S. PATENT DOCUMENTS

| | | | |
|---|---|---|---|
| 5,257,271 A * | 10/1993 | Lagadec et al. | 714/755 |
| 5,365,530 A * | 11/1994 | Yoshida | 714/755 |
| 5,369,652 A * | 11/1994 | Bailey et al. | 714/755 |
| 5,386,425 A * | 1/1995 | Kim | 714/755 |
| 5,392,299 A * | 2/1995 | Rhines et al. | 714/756 |
| 5,432,800 A * | 7/1995 | Kuroda et al. | 714/758 |
| 5,504,773 A | 4/1996 | Padovani et al. | |
| 5,719,884 A * | 2/1998 | Roth et al. | 714/755 |
| 5,740,518 A * | 4/1998 | Takashima et al. | 455/45 |
| 5,757,825 A * | 5/1998 | Kimura et al. | 714/758 |
| 5,828,677 A * | 10/1998 | Sayeed et al. | 714/774 |
| 5,910,182 A * | 6/1999 | Dent et al. | 714/786 |
| 5,946,328 A * | 8/1999 | Cox et al. | 714/784 |
| 5,969,634 A * | 10/1999 | Takashima et al. | 340/7.34 |
| 5,974,581 A * | 10/1999 | Nagai et al. | 714/755 |
| 5,983,387 A * | 11/1999 | Nagai et al. | 714/775 |
| 6,032,283 A * | 2/2000 | Meyer | 714/746 |
| 6,158,038 A * | 12/2000 | Yamawaki et al. | 714/755 |
| 6,185,715 B1 * | 2/2001 | Fang et al. | 714/755 |
| 6,314,542 B1 * | 11/2001 | Nagai et al. | 714/755 |
| 6,357,030 B1 * | 3/2002 | Demura et al. | 714/755 |
| 6,367,047 B1 * | 4/2002 | McAuliffe et al. | 714/755 |
| 6,581,178 B1 | 6/2003 | Kondo | 714/758 |
| 6,738,942 B1 * | 5/2004 | Sridharan et al. | 714/755 |
| 7,356,752 B2 * | 4/2008 | Hewitt et al. | 714/755 |

OTHER PUBLICATIONS

U.S. Appl. No. 08/963,386 entitled "Method and Apparatus for High Rate Packet Data Transmission," filed Nov. 3, 1997, QUALCOMM, Incorporated, San Diego, California (USA).

3G TS 25.212 v3.2.0 (Mar. 2000) 3rd Generation Partnership Project; Technical Specification Group Radio Access Network;Multiplexing and Channel Coding (FDD)(Release 1999).

3G TS 25.213 v3.2.0 (Mar. 2000) 3rd Generation Partnership Project; Technical Specification Group Radio Access Network; Spreading and Modulation (FDD) (Release 1999).

3G TS 25.214 v3.2.0 (Mar. 2000) 3rd Generation Partnership Project; Technical Specification Group Radio Access Network; Physical Layer Procedures (FDD) (Release 1999).

3GPP2 C.S0001-0, Version 1.0, Introduction to cdma2000 Standards for Spread Spectrum, Jul. 1999.

ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).

TIA/EIA/IS-95 "Mobile Station-Base Station Compatibility Standard for Dual-Mode Wideband Spread Spectrum Cellular System" Jul. 1993.

* cited by examiner

METHOD AND AN APPARATUS FOR USE OF CODES IN MULTICAST TRANSMISSION

BACKGROUND OF THE INVENTION

1. Field of the Invention

The current invention relates to the field of communications. More particularly, the present invention relates to the use of codes in multicast transmission.

2. Description of the Related Art

Communication systems have been developed to allow transmission of an information signal from an origination station to one or more physically distinct destination stations. In transmitting the information signal from the origination station over a communication channel, the information signal is first converted into a form suitable for efficient transmission over the communication channel. As used herein, the communication channel comprises a single path over which a signal is transmitted. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception of several signals over a common communication channel. Multiple-access communication systems often include a plurality of remote subscriber units requiring intermittent service of relatively short duration rather than continuous access to the common communication channel. Several multiple-access techniques are known in the art, such as Time Division Multiple-Access (TDMA), Frequency Division Multiple-Access (FDMA), and Amplitude Modulation (AM). Another type of multiple-access technique is used in a Code Division Multiple-Access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

A multiple-access communication system may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention. In accordance with the IS-95 standard, the data or voice is partitioned into code channel frames that are 20 milliseconds wide with data rates as high as 14.4 kbps. Additional examples of communication systems carrying both voice and data are communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system, such as the communication system disclosed in co-pending application Ser. No. 08/963,386, entitled "METHOD AND APPARATUS FOR HIGH RATE PACKET DATA TRANSMISSION," filed Nov. 3, 1997, assigned to the assignee of the present invention. The HDR communication system defines a set of data rates, ranging from 38.4 kbps to 2.4 Mbps, at which an origination terminal (Access Point, AP) may send data to a receiving terminal (Access Terminal, AT).

The information signal to be exchanged among the terminals in a communication system is often organized into a plurality of packets. For the purposes of this description, a packet is a group of bytes, including data (payload) and control elements, arranged into a specific format. The control elements comprise, e.g., a preamble and a quality metric. The quality metric comprises, e.g., Cyclical Redundancy Check (CRC), parity bit(s), and other types of metric known to one skilled in the art. The packets are usually formatted into a message in accordance with a communication channel structure. The message, appropriately modulated, traveling between the origination terminal and the destination terminal, is affected by characteristics of the communication channel, e.g., signal-to-noise ratio, fading, time variance, and other such characteristics. Such characteristics affect the modulated signal differently in different communication channels. Consequently, transmission of a modulated signal over a wireless communication channel requires different considerations than transmission of a modulated signal over a wire-like communication channel, e.g., a coaxial cable or an optical cable. In addition to selecting modulation appropriate for a particular communication channel, other methods for protecting the information signal have been devised. Such methods comprise, e.g., encoding, symbol repetition, interleaving, and other methods know to one of ordinary skill in the art. However, these methods increase overhead. Therefore, an engineering compromise between reliability of message delivery and the amount of overhead must be made. Even with the above-discussed protection of information, the conditions of the communication channel can degrade to the point at which the destination station possibly cannot decode (erases) some of the packets comprising the message. In data-only communications systems, the cure is to re-transmit the non-decoded packets using an Automatic Retransmission reQuest (ARQ) made by the destination station to the origination station.

Often a message is multicast transmitted by the origination station. For the purposes of this document, multicast transmission means transmission of a message that is intended to be received by a plurality of destination stations. However, for the above-discussed reasons, the destination stations may fail to decode a subset of the message. Furthermore, subsets of packets that are not decoded may differ from one destination station to another destination station.

Based on the foregoing, there is a need in the art for a method and an apparatus for multicast transmission that allows each destination station to decode the destination station's faulty subset of packets, and to reconstruct the multicast message.

SUMMARY OF THE INVENTION

The present invention is directed to a method and an apparatus allowing each destination station to decode a multicasted message from an origination station. In one aspect of the invention, the origination station processes each of a plurality of data sets to generate a processed data set and a parity block for each data set, processes a plurality of the parity blocks to generate at least one packet; and transmits the plurality of processed data sets and the at least one packet. The destination station receives a plurality of packets comprising the message, and at least one other packet, decodes each packet of the plurality of packets comprising the message; and decodes each incorrectly decoded packet in accordance with the at least one other packet when a number of the incorrectly decoded packets is less than or equal to a predetermined code distance.

In another aspect of the invention, the origination station processes each of a plurality of data sets to generate a processed data set and a parity block for each data set, transmits the plurality of processed data sets as packets, receives signals containing information about incorrectly decoded packets, and when the signals are received processes a plurality of the parity blocks to generate at least one packet; and transmits the at least one packet. The destination station decodes each packet of the received plurality of packets comprising the message; transmits a report containing at least one number; receives at least one packet in response to the report; and decodes the incorrectly decoded packets in accordance with the received at least one packet.

DETAILED DESCRIPTION OF PREFERRED EMBODIMENTS

Figure 1A:
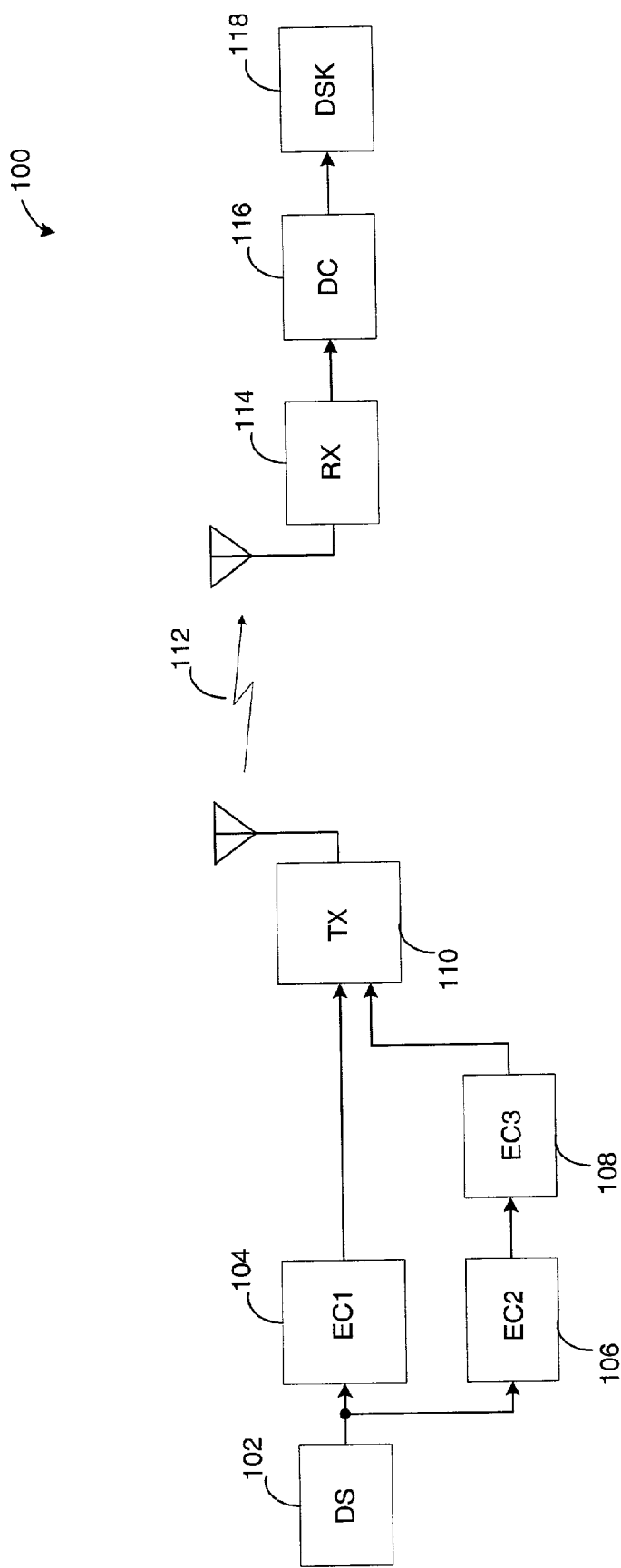
FIGS. 1A-1B illustrate a block diagram of a communication system with shared redundancy.

In order to compare performance of the methods and apparatus in accordance with different embodiments of the present invention, a concept of a baseline system is introduced.

Baseline System

In a baseline system, each of N packets, comprising a message, is sent as an element of a code $C_1$, i.e., each packet is encoded by a code $C_1$. The code $C_1$ contains an amount of redundancy designed to satisfy message delivery with a probability $P_{C1Average}$ under certain, i.e., average, conditions of a communication channel. Furthermore, the code $C_1$ also has the property that the maximum number of packets organized into an N packet message that cannot be decoded correctly by a destination station is less than or equal to S with a probability $P_{C1}$. Consequently, when the variation in the condition of the communication channel between the origination station and the particular destination station(s) degrades below the design criteria, a subset of the packets comprising the message fails to be decoded at the destination station(s).

The amount of redundancy necessary to satisfy reliable message delivery under certain conditions of the communication channel is the only design requirement for selection of the code $C_1$. Thus, the code $C_1$ may be, e.g., an algebraic block code such as a Reed-Solomon code, a state machine code such as a convolutional or trellis code, a classical concatenated code, a serial/parallel concatenated turbo code, or a binary convolutional code, as well as other codes known to one skilled in the art.

For the purposes of quantitatively comparing various methods used by a destination station to decode the packets comprising the message, it can be assumed without loss of generality, that an input signal comprises N blocks of K bytes, which result in $(K+R_1)$ coded bytes when encoded with the code $C_1$. (The term byte as used in this document includes a 1-bit byte.) $R_1$ denotes number of additional byte, related to the number of the input signal bytes K. $R_1$ is the measure of the code $C_1$ redundancy. Therefore, in the baseline system, each of the N packets is transmitted as a sequence of $(K+R_1)$ bytes.

Automatic Retransmission ReQuest

To improve the performance of the baseline system, the non-decoded packets of the message may be re-transmitted using a modification of an ARQ. In such an ARQ arrangement, every destination station reports to the origination station a list of packets that were not decoded correctly. The origination station re-transmits every packet that appears on any of the lists. The process of reporting and re-transmitting is repeated until every destination station decodes all the packets of the message. The fractional overhead (FO) of the ARQ system is analyzed as follows. Let $P_e$ denote the probability that at least one destination station fails to decode a packet sent as an element of the code $C_1$. The average number of bytes (ANB) to be re-transmitted in order to deliver the message to all the destination stations is given by the following equation:

$$ANB = \frac{N \cdot (K + R_1)}{(1 - P_e)} \tag{1}$$

Therefore, the fractional overhead relative to the baseline system ($FO_{ARQ}$) is:

$$FO_{ARQ} = \frac{P_e}{(1 - P_e)} \tag{2}$$

Because the probability $(1-P_e)$ decreases exponentially with an increase in the number of destination stations, the ARQ arrangement efficiency decreases with increasing number of the destination stations. Furthermore, a variable latency exists in this ARQ arrangement.

Full Redundancy per Packet

Another approach allowing every destination station to decode all the packets in the message is to design the communication system in accordance with the worst-case condition of the communication channel. In such an approach, each packet is encoded by a code $C_3$. The code $C_3$ is selected so that each encoded packet is decoded correctly with a probability $P_{C3}$ under the worst-case condition of the communication channel by every destination station. A relationship between a required probability of receiving the message $P_{Message}$ under the worst-case condition of the communication channel and the probability $P_{C3}$ is given by the equation:

$$P_{Message} \approx N \cdot P_{C3} \tag{3}$$

The assumption of the worst-case condition of the communication channel for every transmitted packet makes this scheme very inefficient. A measure of the inefficiency is the number of extra bytes transmitted as compared to the baseline system. For the purposes of quantitatively characterizing this method it can be assumed, that K bytes of an input signal result in ($K+R_3$) coded bytes when encoded with the code $C_3$. One of ordinary skill in the art recognizes that because the code $C_3$ is designed to deliver the message under the worst-case condition of the communication channel while the code $C_1$ was designed to deliver the message under average conditions of the communication channel, the amount of redundancy of the code $C_3$ is greater than the amount of redundancy of the code $C_1$. Consequently, the number of parity bytes $R_3$ is greater than the number of parity bytes $R_1$. This relationship is expressed as:

$$R_3 = R_1 + R_{13} \quad (4)$$

where $R_{13}$ is the number of extra parity bytes of the code $C_3$ in relation to the code $C_1$. Because $R_2$ extra bytes are transmitted per packet in this arrangement relative to the baseline system, the N packets comprising the message contain a total of $NR_2$ extra bytes relative to the baseline system. The fractional overhead (FOFRPP) is:

$$FO_{FRPP} = \frac{R_{13}}{(K+R_1)} \quad (5)$$

The amount of redundancy necessary to satisfy message delivery under the worst-case condition of the communication channel is the only design requirement on the code $C_3$. Thus, the code $C_3$ may be, e.g., an algebraic block code such as a Reed Solomon code, or a state machine code such as a convolutional or trellis code. The code $C_3$ may also be a classical concatenated code, a serial/parallel concatenated turbo code, or a binary convolutional code, as well as other codes known to one skilled in the art.

Shared Redundancy

FIG. 1A illustrates a conceptual block diagram of a communication system employing shared redundancy.

In one embodiment, a Data Source (DS) 102 generates an information signal to be multicasted. The information signal is divided into N blocks, each block comprising K bytes. The N blocks are provided to a first encoder (EC1) 104, which encodes each of the N blocks with a code $C_1$, providing a packet comprising $K+R_1$ code bytes as shown in FIG. 1A. The code $C_1$ is selected so that the maximum number of packets organized into an N packet message that cannot be decoded correctly by a destination station is less than or equal to S with probability $P_{C1}$.

Figure 1B:
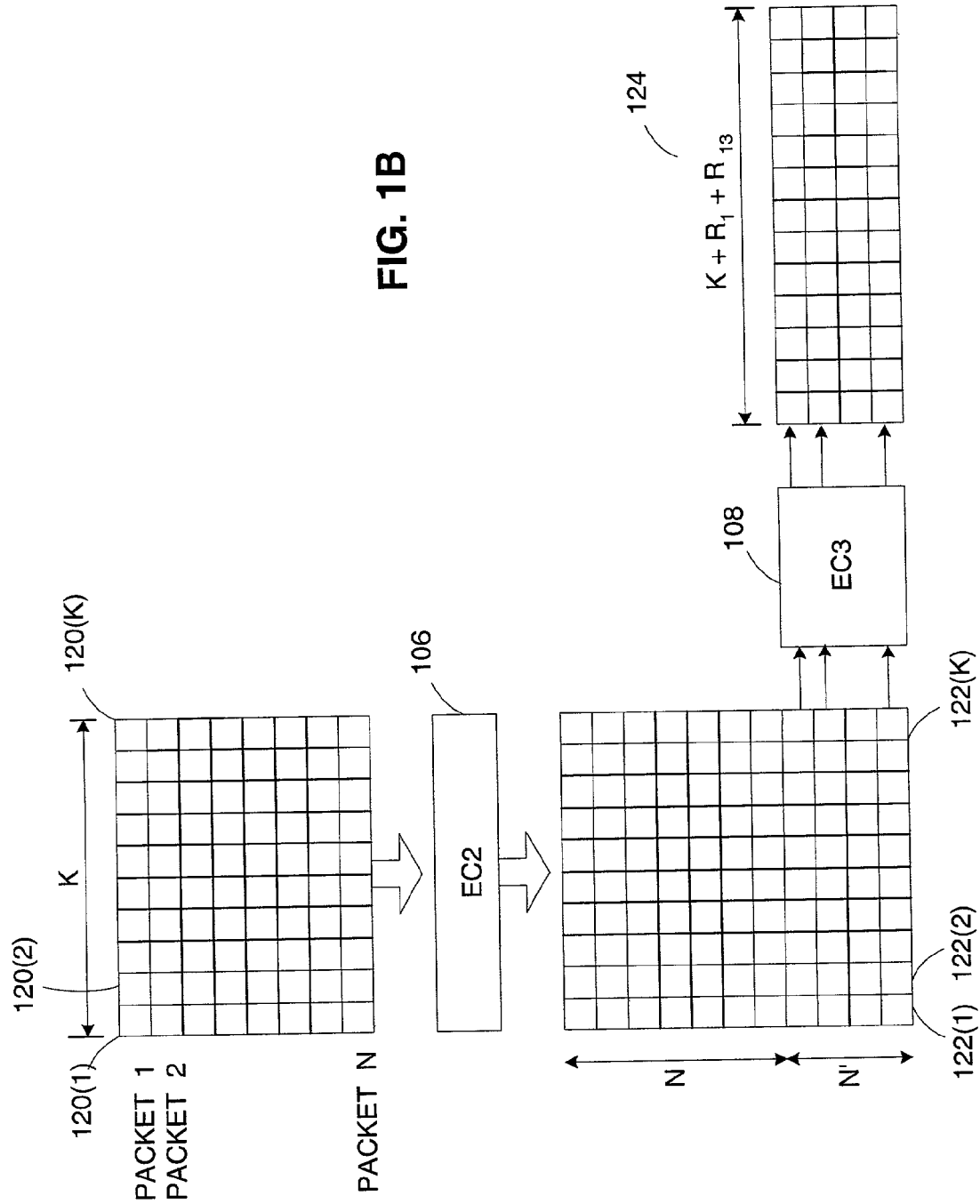

The N blocks are also provided to a second encoder (EC2) 106. Referring to FIG. 1B, in one embodiment, the i-th byte of each of the N blocks is combined to form an i-th input data block 120. Each input data block 120 is then provided to the encoder 106, which is a systematic block encoder 106 in one embodiment. For the purposes of this document, a systematic code comprises a permutation of information (systematic) bytes and parity bytes. Thus, a systematic code is defined by the following equation:

$$x = \pi(u, p) \quad (6)$$

where:
x is the coded signal;
π is a permutation;
u are systematic bytes; and
p are parity bytes.

The systematic block encoder 106 encodes each input data block 120 with a systematic code $C_4$ having a minimum distance greater than S, resulting in K encoded packets 122. Each encoded packet 122 comprises N systematic bytes and N' parity bytes. In one embodiment, a systematic Reed-Solomon (RS) code with N'=S, which is guaranteed to have a minimum distance of (S+1), is used.

In another embodiment, the NK systematic bytes of the N packets are provided to a systematic block encoder 106. The systematic block encoder 106 encodes the NK systematic bytes with a systematic code $C_5$. The systematic code $C_5$ is selected to be capable of correcting segments in the NK systematic bytes when each of the segments contains a maximum of S errors. A segment comprises the i-th systematic byte of each of the N packets. In one embodiment, a Reed-Solomon code having a minimum distance greater than KS is used.

The encoding by the encoder 106 results in NK systematic bytes and N'K parity bytes. The N'K parity bytes computed by the encoder 106 are provided to a third encoder (EC3) 108. The encoder 108 encodes the N'K parity bytes with the code $C_3$. The code $C_3$ is selected so that a packet sent as an element of the code $C_3$ is decoded correctly with a probability $P_{C3}$ by every destination station. A relationship between a required probability of receiving the message $P_{Message}$, the probability PC1, and the probability $P_{C3}$ is given by the following equation:

$$P_{Message} \approx P_{C1} + P_{C3} \quad (7)$$

Therefore, given a reliability requirement for message delivery expressed in terms of $P_{Message}$, Equation (7) is used for selection of the codes $C_1$ and $C_3$.

The purpose of encoding the N'K parity bytes by the code $C_3$ is to deliver the encoded N'K parity bytes 122 with reliability expressed in terms of $P_{C3}$. Consequently, there is no restriction on the organization of the encoded N'K parity bytes 122. Therefore, the encoded N'K parity bytes 122 may be organized in an arbitrary number of packets. Consequently, in one embodiment, the encoded N'K parity bytes 122 form one packet. In another embodiment, the encoded N'K parity bytes 122 are organized into a plurality of packets.

Referring back to FIG. 1A, the output signals of the encoder 104 and the encoder 108 are provided to a transmitter (TX) 110. The transmitter 110 performs processing of the provided signals in accordance with a modulation scheme used. In one embodiment, the modulation is carried out in accordance with the requirements of a wireless communication channel. The transmitter 110 then transmits the N packets provided by the encoder 104 and the packet or packets provided by the encoder 108 over a communication channel 112. Although a wireless communication channel is shown in FIG. 1, one of ordinary skill in the art recognizes that the communication channel 112 can be wire-like, e.g., a coaxial cable, an optical cable, etc. In such an embodiment, the modulation is carried out in accordance with the requirements of the particular wire-like communication channel.

A receiver (RX) 114 receives the N-packet message and the packet or packets of the encoded N'K parity bytes 122 of FIG. 1B. The receiver 114 processes the packets in accordance with a demodulation scheme. Generally, an inverse of the modulation process employed by the transmitter 110 is used. The processed packets are provided to a decoder (DC) 116. The decoder 116 decodes each of the N received message packets. As discussed, at most S of the N packets fail to decode. The decoder 116 then decodes the N'K parity bytes and uses the N'K parity bytes to reconstruct the non-decoded packets. The reconstruction may be carried out in accordance with any method known to one of ordinary skill in the art. For example, a method for a systematic Reed Solomon (RS) code is disclosed in Truong, T.-K., Jeng, J., H., and Hung, K.-CH., Inversionless Decoding of Both Errors and Erasures of Reed-Solomon Code. The decoded packets are provided to a data sink (DSK) 118.

The Total Number of Bytes (TNB) transmitted by this scheme when RS is used is:

$$TNB = N \cdot (K+R_1) + N' \cdot (K+R_3) \qquad (8)$$

Because $N'(K+R_3)=S(K+R_3)$ extra bytes are transmitted per packet relative to the baseline system, the fractional overhead (FOSR) is:

$$FO_{SR} = \left(\frac{S}{N}\right) \cdot \left(1 + \frac{R_{13}}{(K+R_1)}\right) \qquad (9)$$

Shared Redundancy with Punctured Bytes

Figure 2A:
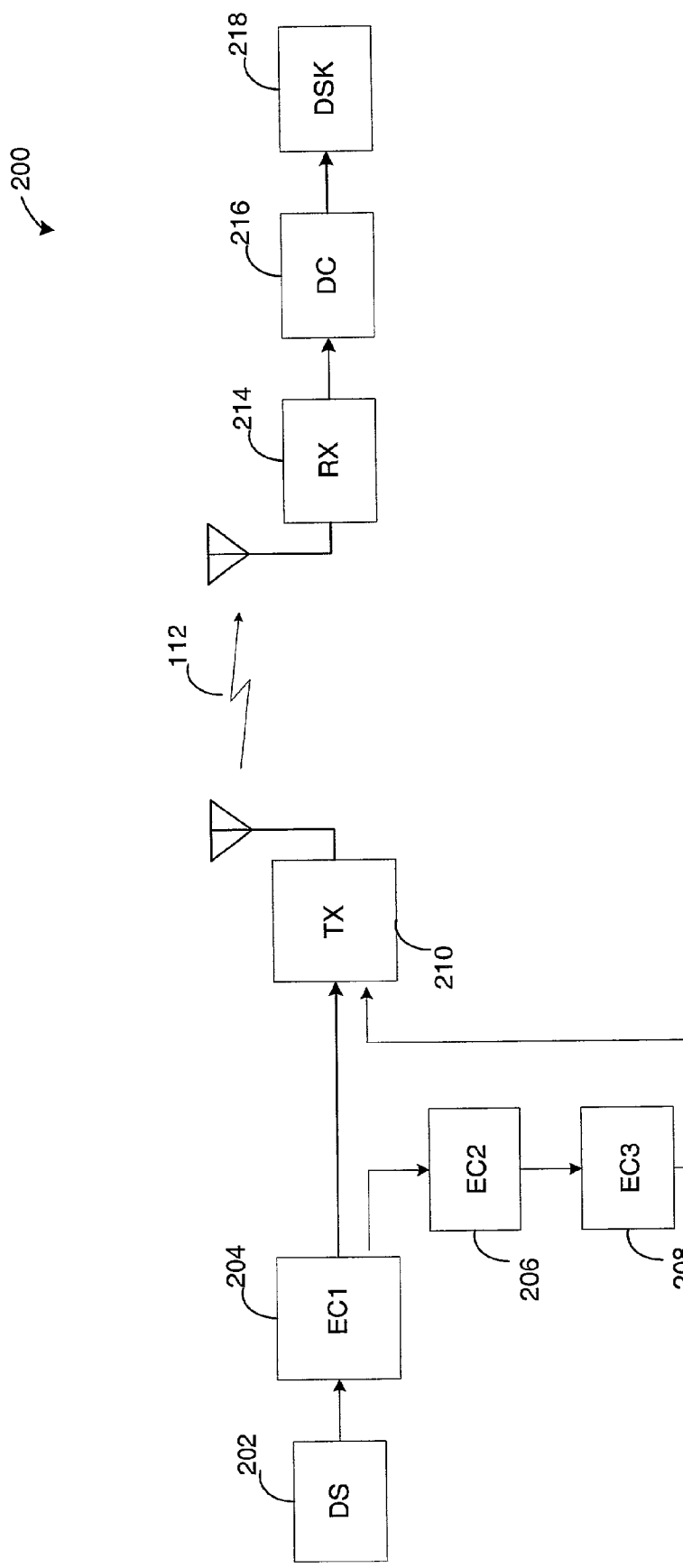
FIGS. 2A-2D illustrate a block diagram of a communication system with shared redundancy with punctured bytes.

FIG. 2A illustrates a conceptual block diagram of a communication system employing shared redundancy with punctured bytes.

In one embodiment, a Data Source (DS) 202 generates an information signal to be multicasted. The information signal is divided into N blocks, each block comprising K bytes, and the blocks are provided to an encoder ($EC_1$) 204. The encoder 204 encodes each of the N blocks with a code $C_1$, providing a packet comprising $K+R_1$ code bytes as shown in FIG. 2B. The code $C_1$ is selected so that the maximum number of packets organized into an N-packet message that cannot be decoded correctly by a destination station is less than or equal to S.

Figure 2C:
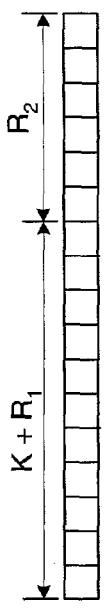
Figure 2B:

The encoder 204 also computes $R_2$ parity bytes of a code $C_2$ for each of the N blocks, providing a packet structure illustrated in FIG. 2C. The packet structure encoded by the code $C_2$ comprises $K+R_1$ coded bytes (i.e., a structure of a packet encoded by the code $C_1$) appended by the $R_2$ parity bytes. Consequently, the code $C_2$ is an extension of the code $C_1$. In other words, the code $C_1$, is a punctured version of the code $C_2$. The code $C_2$ is selected so that a packet sent as an element of the code $C_2$ is decoded correctly with a probability $P_{C2}$ by every destination station.

One of ordinary skill in the art recognizes that different apparatuses and methods accomplish encoding of the information signal to provide the packet structures shown in FIGS. 2B and 2C. However, as long as the particular apparatus and method provide the packet structures of FIGS. 2B and 2C, a selection of a particular apparatus and method is a matter of implementation.

Figure 2D:
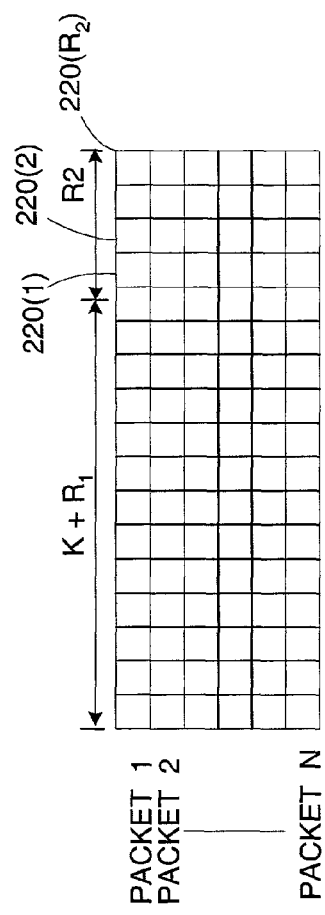
Figure 2D:

The $NR_2$ parity bytes computed by the encoder 204 for the N-packet message are further encoded. In one embodiment, illustrated in FIG. 2D, the i-th parity byte of each of the N packets is combined to form an i-th input data block 220. Each input data block 220 is provided to a systematic block encoder ($EC_2$) 206. The systematic block encoder 206 encodes each input data block 220 by a systematic code $C_4$, having a minimum distance greater than S, resulting in $R_2$ encoded packets. Each encoded packet comprises N systematic bytes and N' parity bytes. In one embodiment, a systematic Reed-Solomon code with N'=S, which is guaranteed to have a minimum distance of (S+1), is used. Although FIG. 2D illustrates the input data bytes 220 to be encoded in parallel, one of ordinary skill in the art recognizes that such an illustration is for pedagogical reasons only, and other arrangements, e.g., serial encoding, are possible.

In another embodiment (not shown), the $NR_2$ parity bytes are provided to the systematic block encoder 206. The systematic block encoder 206 encodes the $NR_2$ parity bytes with a systematic code $C_5$. The systematic code $C_5$ is selected to be capable of correcting segments in the $NR_2$ parity bytes when each of the segments contains a maximum of S errors. A segment comprises the i-th systematic byte of each of the N packets. In one embodiment, a systematic Reed-Solomon code having a minimum distance greater than $R_2S$ is used.

The above-described encoding results in $NR_2$ systematic bytes and $N'R_2$ parity bytes. The $N'R_2$ parity bytes computed by the encoder 206 are provided to an encoder ($EC_3$) 208. The encoder 208 encodes the $N'R_2$ parity bytes with the code $C_3$. The code $C_3$ is selected so that a packet sent as an element of the code $C_3$ is decoded correctly with a probability $P_{C3}$ by every destination station. A relationship between a required probability of receiving the message $P_{Message}$, the probability $P_{C2}$, and the probability $P_{C3}$ is given by the following equation:

$$P_{Message} \approx S \cdot P_{C2} + P_{C3} \qquad (10)$$

Therefore, given a reliability requirement for message delivery expressed in terms of $P_{Message}$, Equation (10) is used for selection of the codes $C_2$ and $C_3$.

The purpose of encoding the $N'R_2$ parity bytes with the code $C_3$ is to deliver the encoded $N'R_2$ parity bytes 224 from an origination station to a destination station with reliability expressed in terms of $P_{C3}$. Consequently, there is no restriction on the organization of the encoded $N'R_2$ parity bytes 224. Therefore, the encoded $N'R_2$ parity bytes 224 may be organized in an arbitrary number of packets. Consequently, in one embodiment, the encoded $N'R_2$ parity bytes 224 form one packet. In another embodiment, the encoded $N'R_2$ parity bytes 224 are organized into a plurality of packets.

Referring back to FIG. 2A, the output signals of the encoder 204 and the encoder 208 are provided to a transmitter 210. The transmitter 210 performs processing of the provided signals in accordance with the modulation scheme used. In one embodiment, the modulation is carried out in accordance with the requirements of a wireless communication channel. The transmitter 210 then transmits the N packets provided by the encoder 204 and the packet or packets provided by the encoder 208 over a communication channel 112. Although a wireless communication channel is shown in FIG. 2A, one of ordinary skill in the art recognizes that the communication channel 112 can be wire-like, e.g., a coaxial cable, an optical cable, etc. In such an embodiment, the modulation is carried out in accordance with the requirements of the particular wire-like communication channel.

A receiver 214 receives the N-packet message and the packet or packets of the encoded $N'R_2$ parity bytes 224 of FIG. 2D. The receiver 214 processes the packets in accordance with a demodulation scheme. Generally, an inverse of the modulation process employed by the transmitter 210 is used. The processed packets are provided to a decoder 216. The decoder 216 decodes each of the N received message packets. As discussed, at most S of the N packets fail to decode. The decoder 216 then decodes the $N'R_2$ parity bytes, and uses the $N'R_2$ parity bytes to recover the non-decoded packets using the method illustrated in FIG. 3. The decoded packets are provided to a data sink 218.

Figure 3:
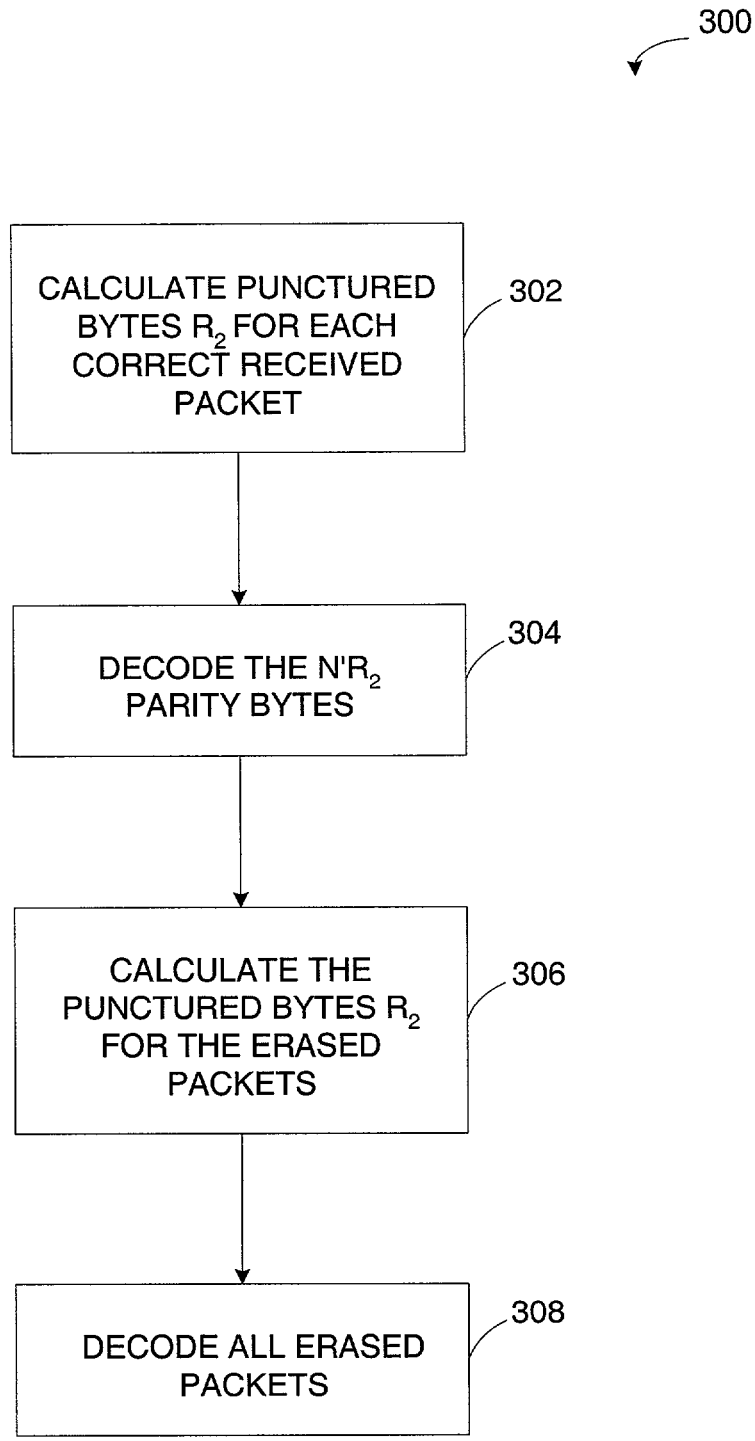
FIG. 3 illustrates a method used by a j-th destination station to recover erased packets.

Referring to FIG. 3, in step 302, a method computes the $R_2$ punctured bytes for each of the N message packets that were correctly decoded. (Thus, the decoder computes at least $(N-S)R_2$ punctured bytes in this manner.) The $(N-S)R_2$ punctured bytes are also the systematic bytes of the Reed-Solomon code. The method then continues in step 304.

In step 304, the packet or packets of the encoded $N'R_2$ parity bytes are decoded. Because the packet or packets were encoded by the code $C_3$, decoding is successful with high reliability. The method then continues in step 306.

In step 306, the remaining $SR_2$ punctured bytes, which are also the systematic bytes of the Reed-Solomon code, are recovered using the $N'R_2$ parity bytes, using the erasure correction capability of the Reed-Solomon code. An example of the erasure correction capability of the Reed-Solomon code is disclosed in Truong, T.-K., Jeng, J., H., and Hung, K.-CH., Inversionless Decoding of Both Errors and Erasures of Reed-Solomon Code. The method then continues in step 308.

In step 308, the punctured bytes recovered in step 306 now provide enough redundancy to decode all of the packets that were not yet decoded.

Because the total number of extra bytes transmitted by this scheme relative to the baseline system is $[SR_2(1+(R_1+R_{13})/K)]$, the fractional overhead (FOSRPB) relative to the baseline scheme is given as:

$$FO_{SRPB} = \left(1 + \frac{R_1 + R_{13}}{K}\right) \cdot \left(\frac{S}{N}\right) \cdot \left(\frac{R_2}{K+R_1}\right) = \left(\frac{S}{N}\right) \cdot \left(\frac{R_2}{K}\right) \cdot \left(1 + \frac{R_{13}}{K+R_1}\right) \quad (11)$$

Comparing the results for the disclosed system with the Shared Redundancy System, yields:

$$\frac{FO_{SRPB}}{FO_{SR}} = \frac{R_2}{K} \quad (12)$$

Therefore, for $R_2 \ll K$ the Shared Redundancy System with Punctured Bytes is more efficient than the Shared Redundancy System.

Table 1 shows the fractional overhead associated with the above-discussed methods for a typical set of parameter values.

TABLE 1

|  | ARQ | Full Redundancy | Shared Redundancy | Shared Redundancy with Punctured Bytes |
|---|---|---|---|---|
| FO | $P_e/(1 - P_e)$ | $R_2/(K + R_1)$ | (S/N) * (1 + $R_{13}$/ (K + $R_1$)) | (S/N * ($R_2$/K) * (1 + $R_{13}$/(K + $R_1$)) |
| FO for values: $P_e = 0.4$, K = 128, $R_1 = 0$, $R_2 = 40$, S = 0.2 N | 66.67% | 31.25% | 26.25% | 8.2% |

Shared Redundancy with Punctured Bytes and ARQ

In another embodiment, referring back to FIGS. 2A-D, the information signal processing by the data source 202, the encoder 204, and the encoder 206 may be identical to the processing described above in the "Shared Redundancy with Punctured Bytes" embodiment.

The output signal of the encoder 204 is provided to a transmitter 210. The transmitter 210 performs processing of the provided signal in accordance with the processing described above in the "Shared Redundancy with Punctured Bytes" embodiment.

The receiver 214 at each destination station receives the N message packets and processes the packets in accordance with the demodulation scheme. Such processing is generally achieved by using an inverse of the modulation process employed by the transmitter 210. The processed packets are provided to a decoder 216. The decoder 216 decodes the N packets, and determines how many packets failed to decode. Each destination station then informs the origination station about how many packets the destination station was unable to decode. Let $S_j$ denote the number of packets erased by the j-th destination station. Then, it is sufficient that the origination station send $S'R_2$ parity bytes of the Reed-Solomon code, where S' is given by Equation (13):

$$S' = \max(S_j) \quad (13)$$

The $S'R_2$ parity bytes are provided to an encoder 206. The processing of the $S'R_2$ parity bytes by the encoder 206 and the encoder 208 may be identical to the processing described above in the "Shared Redundancy with Punctured Bytes" embodiment.

The output signal of the encoder 208 is provided to a transmitter 210, which transmits the properly modulated signal to the receiver 214. The receiver 214 processes the packet or packets in accordance with a demodulation scheme, and provides the demodulated packet or packets to the decoder 216. The decoder 216 then uses the $S'R_2$ parity bytes to recover the non-decoded packets using the method illustrated in FIG. 3. The decoded packets are provided to the data sink 218.

If S' is considerably lower than S most of the time, then this embodiment is more efficient than the above-described "Shared Redundancy with Punctured Bytes" embodiment.

Modified Shared Redundancy with Punctured Bytes and ARQ

In another embodiment, the destination stations are configured to determine the number of first punctured bytes necessary to decode a packet that failed to decode when sent as an element of code $C_1$. In accordance with the embodiment, referring to FIGS. 2A-D, the information signal processing by the data source 202 and the encoder 204 may be identical to the processing described above in the "Shared Redundancy with Punctured Bytes" embodiment.

The $NR_2$ parity bytes computed by the encoder 204 are further encoded. Referring to FIG. 2D, the i-th parity byte of each of the N packets is combined to form an i-th input data block 220. Each input data block 220 is provided to a systematic block encoder 206. The systematic block encoder 206 encodes each input data block 220 by a systematic code $C_4$, having a minimum distance greater than S, resulting in an $R_2$ encoded packets 222, each packet 222 comprising N systematic bytes and N' parity bytes. In one embodiment, a systematic Reed-Solomon (RS) code with N'=S, which is guaranteed to have a minimum distance of (S+1), is used. The above-described encoding results in $NR_2$ systematic bytes and $N'R_2$ parity bytes.

The output signal of the encoder 204 of FIG. 2A is provided to a transmitter 210. The transmitter 210 performs processing of the provided signal in accordance with the processing described above in the "Shared Redundancy with Punctured Bytes" embodiment.

The receiver 214 at each destination station receives the N packets and processes the packets in accordance with the demodulation scheme. Such processing is generally achieved by using an inverse of the modulation process employed by the transmitter 210. The processed packets are then provided to a decoder 216. The decoder 216 attempts to decode the N packets, and determines, for each non-decoded packet, how many punctured parity bytes are required so that each non-decoded packet is decoded correctly. Each destination station, e.g., the j-th destination station, reports to the origination station $R_2$ different numbers $S_{j,1}, S_{j,2}, S_{j,3}, \ldots, S_{j,R2}$, where $S_{j,m}$ denotes the number of packets that require only the first m punctured parity bytes in order to be decoded correctly by the destination station. Thus, the total number of erased packets for j-th destination station is:

$$S_j \equiv \sum_{m=1}^{R_2} S_{j,m} \quad (14)$$

The origination station then selects $P_i$ parity bytes of the i-th RS code for each $i=1, 2, \ldots, R_2$, where:

$$Q_i = \max_j \left[ \sum_{m=i}^{R_2} S_{j,m} \right] \quad (15)$$

The selected $Q_i$ parity bytes are provided to the encoder 208. The encoder 208 encodes the selected $Q_i$ parity bytes with the code $C_3$. The code $C_3$ is selected so that a packet sent as an element of the code $C_3$ is decoded correctly with a probability $P_{C3}$ by every destination station. A relationship between a required probability of receiving the message $P_{Message}$, the probability $P_{C2}$, and the probability $P_{C3}$ is given by the following equation:

$$P_{Message} \approx P_{C2} + S \cdot P_{C3} \quad (16)$$

Therefore, given the requirement of message delivery expressed in terms of $P_{Message}$, Equation (16) is used for selection of codes $C_2$ and $C_3$.

The purpose of encoding the $Q_i$ parity bytes by the code $C_3$ is to deliver the encoded $Q_i$ parity bytes with reliability expressed in terms of $P_{C3}$. Consequently, there is no restriction on the organization of the encoded $Q_i$ parity bytes. Thus, the encoded $Q_i$ parity bytes may be organized in an arbitrary number of packets. Consequently, in one embodiment, all of the $Q_i$ parity bytes form one packet. In another embodiment, the $P_i$ parity bytes are organized into a plurality of packets.

Figure 4:
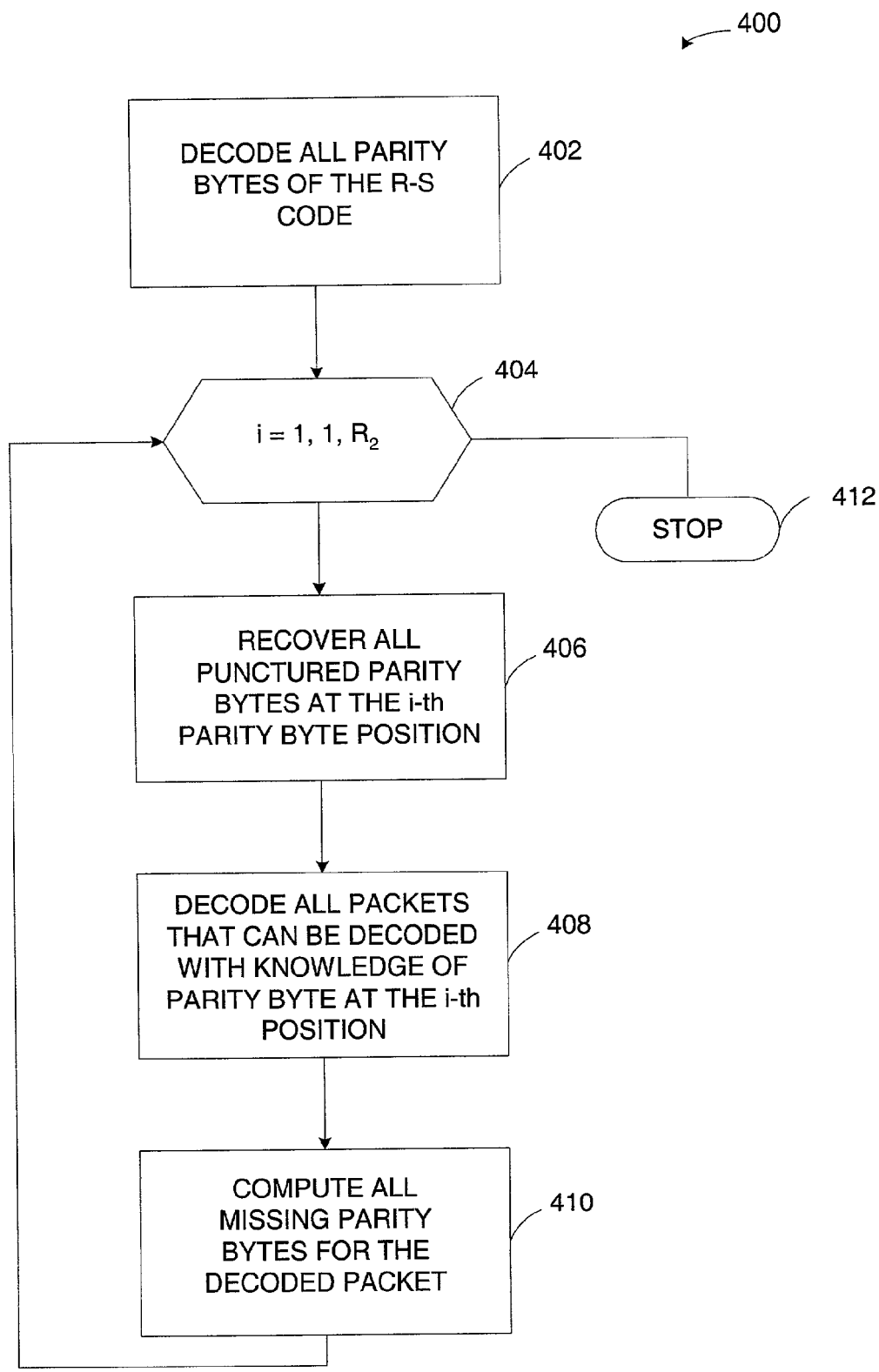
FIG. 4 illustrates another method used by the j-th destination station to recover erased packets.

FIG. 4 illustrates a method used by the j-th destination station to recover the erased packets.

In step 402 the packet or packets containing the selected $Q_i$ parity bytes of the RS code received by the j-th destination station from the origination station are decoded. Because the packet or packets were protected by the code $C_3$, decoding is always successful. The method continues in step 404.

In step 404, the variable i is initiated to the value 1, and compared against $R_2$. If the value of the variable i is smaller than $R_2$, the method continues in step 406; otherwise the method continues in step 412.

In step 406, the j-th origination station decoder recovers the punctured byte at the first punctured byte position of each erased packet from the first $P_1$ parity bytes of the first RS code. This recovery is always possible because $S_j \leq P_1$. The method continues in step 408.

In step 408, the decoder decodes $S_{j,1}$ packets. The method continues in step 410.

In step 410, all the missing punctured bytes for the packets decoded in step 408 are computed. The total number of missing punctured bytes at the second punctured byte position is given by $S_j - S_{j,1} \leq P_2$. The method returns to step 404.

In step 412, the method stops because all packets comprising the message have been computed.

The total number of extra bytes transmitted by this method relative to the baseline system is:

$$\left(1 + \frac{R_1 + R_{13}}{K}\right) \sum_{i=1}^{R_2} Q_i = \left(1 + \frac{R_1 + R_{13}}{K}\right) \sum_{i=1}^{R_2} \max_j \left[ \sum_{m=i}^{R_2} S_{j,m} \right] \leq \quad (17)$$

$$\left(1 + \frac{R_1 + R_{13}}{K}\right) \sum_{i=1}^{R_2} \max_j \left[ \sum_{m=i}^{R_2} S_{j,m} \right] =$$

$$\left(1 + \frac{R_1 + R_{13}}{K}\right) R_2 \max_j (S_j) = \left(1 + \frac{R_1 + R_{13}}{K}\right) R_2 S'$$

Because this number is smaller than the number of bytes ($R_2 S'$) of the previous embodiment, a system in accordance with this embodiment may be more efficient.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a General Purpose Processor (GPP), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (presumably previously defined broadly). In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for multicast transmission of a message, comprising:
    encoding each of a plurality of data sets using a first code with a first amount of redundancy to generate a coded data set and for each data set, wherein each coded data set comprises a first parity block;
    puncturing the first parity block for each coded data set to generate a second parity block comprising a portion of the first parity block that is not punctured out and a third parity block comprising a portion of the first parity block that is punctured out;
    encoding the third parity blocks using a second code to generate first coded parity blocks;
    encoding the first coded parity blocks using a third code with a second amount of redundancy to generate second coded parity blocks;
    processing the second coded parity blocks to generate at least one packet; and
    transmitting the second parity blocks and the at least one packet.

2. The method of claim 1 wherein the second code is a systematic code.

3. The method of claim 1 wherein the second code has a pre-determined code distance.

4. The method of claim 1 wherein the second code is a Reed-Solomon code.

5. An apparatus for multicast transmission of a message, comprising:
    a processor;
    a storage medium coupled to the processor and comprising a set of instructions executable by the processor to:
    encode each of a plurality of data sets using a first code with a first amount of redundancy to generate a coded data set for each data set, wherein each coded data set comprises a first parity block;
    puncture the first parity block for each coded data set to generate a second parity block comprising a portion of the first parity block that is not punctured out and a third parity block comprising a portion of the first parity block that is punctured out;
    encode the third parity blocks using a second code to generate first coded parity blocks;
    encode the first coded parity blocks using a third code with a second amount of redundancy to generate second coded parity blocks;
    process the second coded parity blocks to generate at least one packet; and
    transmit the second parity blocks and the at least one packet.

6. The apparatus of claim 5 wherein the second code is a systematic code.

7. The apparatus of claim 5 wherein the second code has a predetermined code difference.

8. The apparatus of claim 5 wherein the second code is a Reed-Solomon code.

* * * * *